May 27, 1958 L. ALESSIO 2,836,459
DUMP TRUCK
Filed May 28, 1952 5 Sheets-Sheet 1

INVENTOR.
LINO ALESSIO
BY
ATTORNEY

May 27, 1958

L. ALESSIO 2,836,459

DUMP TRUCK

Filed May 28, 1952

INVENTOR.
LINO ALESSIO

BY

*Gordon C. Mask*

ATTORNEY

May 27, 1958 L. ALESSIO 2,836,459
DUMP TRUCK
Filed May 28, 1952 5 Sheets-Sheet 3

INVENTOR.
LINO ALESSIO
BY
Gordon P. Week
ATTORNEY

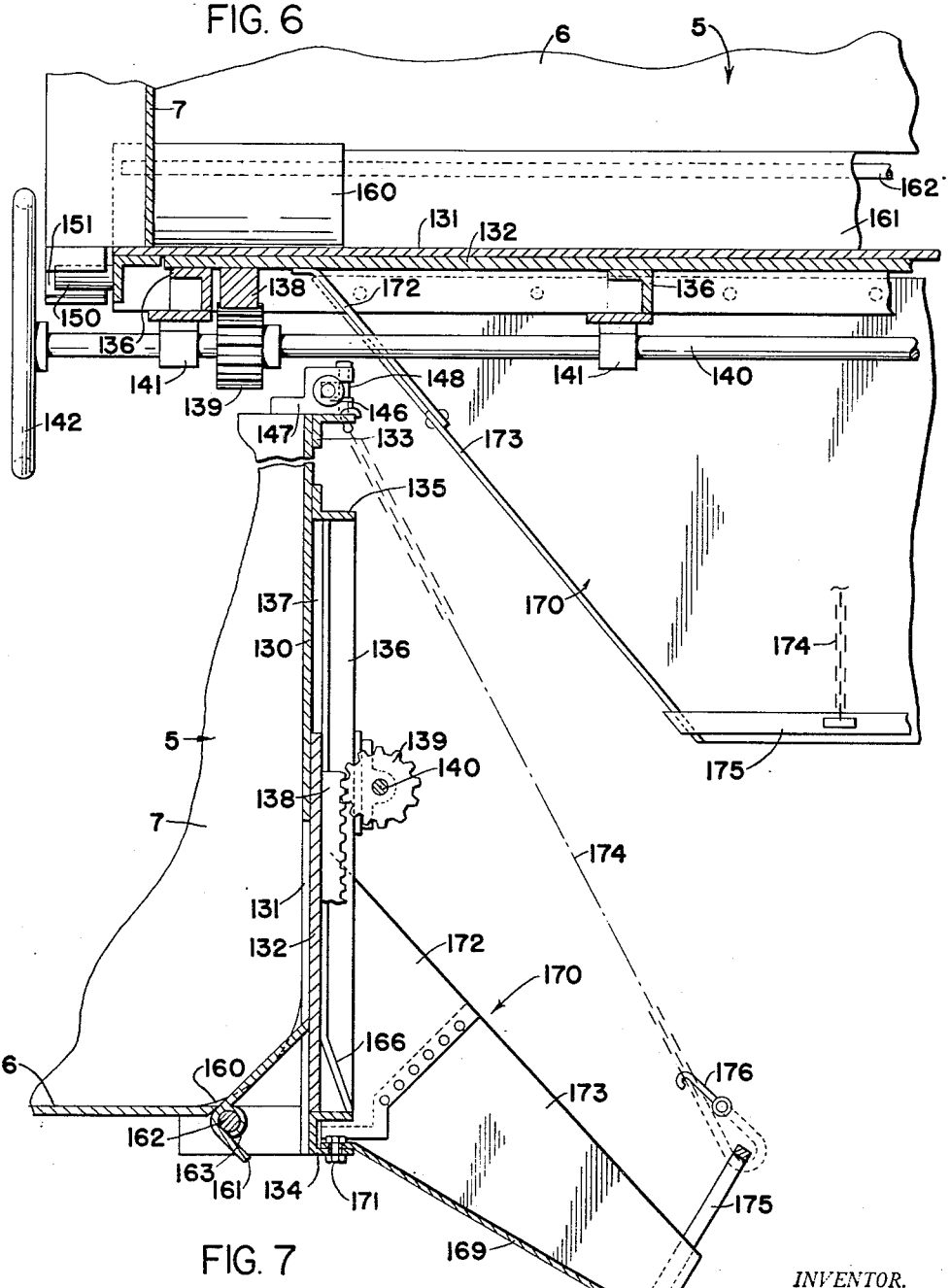

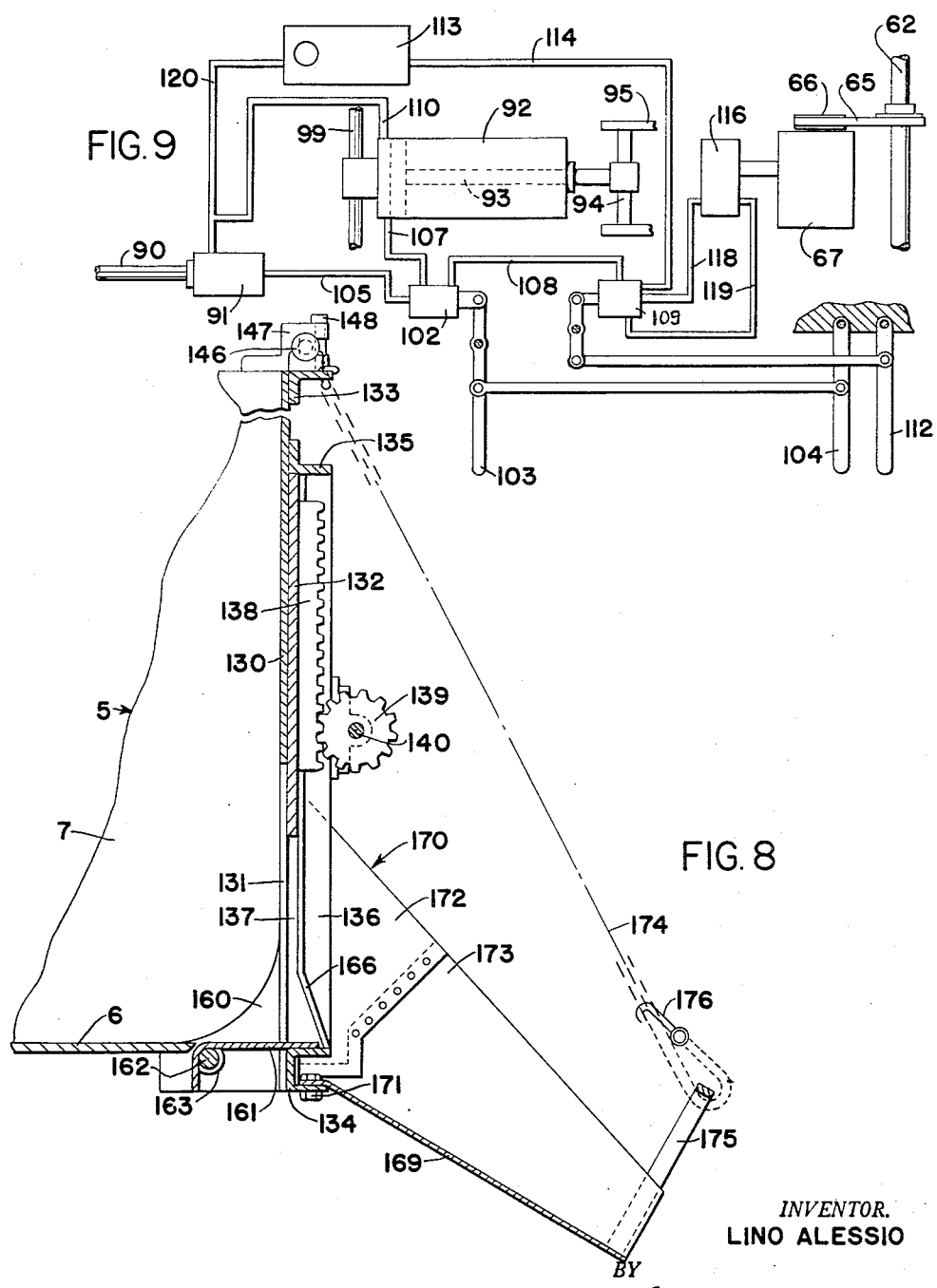

United States Patent Office 2,836,459
Patented May 27, 1958

2,836,459

DUMP TRUCK

Lino Alessio, Akron, Ohio

Application May 28, 1952, Serial No. 290,603

13 Claims. (Cl. 298—22)

This invention relates to an improved dump truck for hauling mixed concrete, etc.

The truck body may be used for hauling various building materials ordinarily hauled in a truck, such as brick, tile, dirt, sand, etc., but is especially designed so that it can be used for hauling mixed concrete on occasion; and a rig is provided for agitating the concrete on such occasions. A novel hydraulic drive means is used for reciprocating the rig. An improved rear end prevents the concrete from packing en route without interfering with the hauling of materials other than concrete and without interfering with discharge of the concrete from the truck. A new tailgate is provided which may be operated in the conventional fashion for discharge of materials other than concrete. It is provided with a door designed particularly to control the rate at which the concrete is discharged. The truck includes various novel features which are illustrated in the accompanying drawings, and will be more particularly described with reference to them. In the drawings:

Fig. 6 is a horizontal view on the line 6—6 of Fig. 5 and shows more particularly the construction of the rear of the truck body and the tailgate with the closure therefor and means for operating the same;

Fig. 7 is a vertical section on the line 7—7 of Fig. 5 and shows more particularly the tailgate with the opening therein and the closure means therefor in the closed position, together with a chute attached to the rear of the truck, and a section through a swivel member at the rear of the bed of the truck body which will be explained in more detail in what follows;

Fig. 8 is a similar view but with the closure member raised, and the swivel member in the horizontal position;

Fig. 9 is a plan view (not to scale) of the hydraulic system for dumping the truck and reciprocating the rig; and Fig. 10 is a view on the line 10—10 of Fig. 1 showing a section through one end of the agitator and the link which connects the rig with the driving chain.

The truck body and rig

Figure 1:
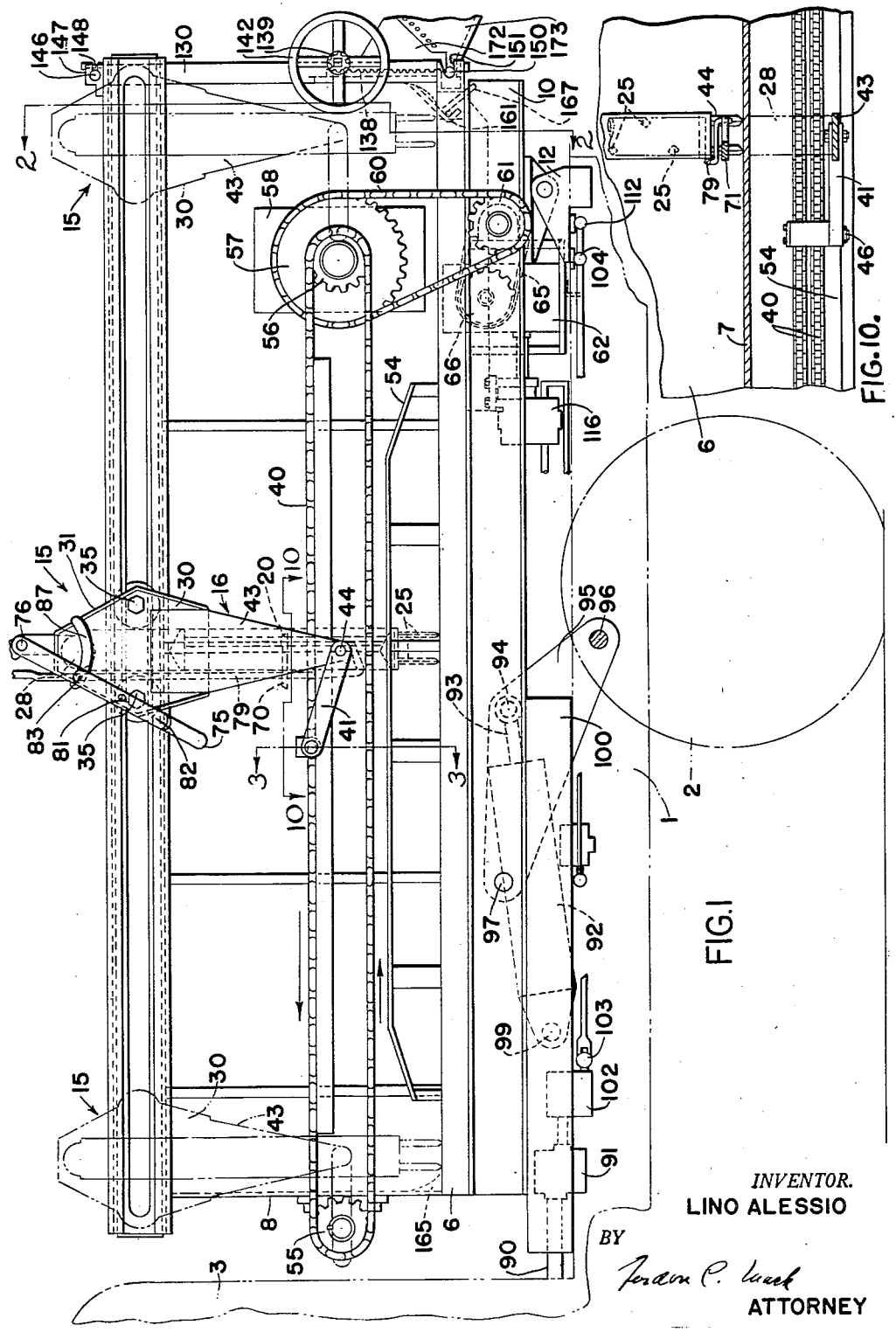
Fig. 1 is a side view of the truck body and includes a part of the chassis and rear wheels in broken lines.

The truck is formed with a usual chassis 1 and rear wheels 2. The front wheels (not shown) and cab 3 are also conventional. The truck body 5 is formed of the bed 6, side panels 7, and front closure member 8, which may be conventional. The rear of the body and the tailgate are of novel design and will be explained in what follows.

The bed is supported on rails 10. At the rear the rails are fastened to the chassis by any usual pivot means 12. To dump the truck body, its front end is lifted by means to be described, as its rear end pivots on the means 12.

Figure 4:
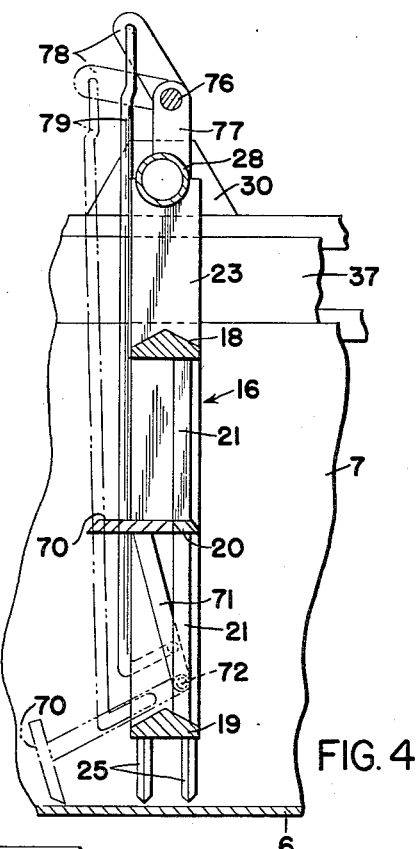
Fig. 4 is a section through the rig on the line 4—4 of Fig. 2.

The rig 15 which is mounted to reciprocate along the top of the side panels 7 includes an agitator 16 which keeps the mixed concrete in gentle motion as the rig is reciprocated from one end of the truck body to the other. The agitator includes a top cross bar 18, a bottom cross bar 19, an intermediate cross bar 20, and several uprights 21. Fig. 4 shows that the top and bottom cross bars 18 and 19 are beveled at the front and rear edges and the intermediate bar 20 is beveled at the rear edge to facilitate movement through a body of mixed concrete. The front edge of the bar 20 is not beveled, for a reason to be explained. The cross members are fastened to side supports 23 which stop short of the bed of the truck body. Extending downwardly from the bottom cross bar 19 are two rows of spikes 25 which are staggered (see Fig. 10) and spaced sufficiently to permit the passage of the concrete aggregate between them. The spikes are preferably square or hexagonal in cross section, and positioned with one corner toward the front and another toward the rear to present minimum resistance to their movement through the concrete (see Fig. 10). Spikes 26 at the ends of the botom of the agitator prevent aggregate in the concrete from setting up at the side corners of the truck body.

The uprights 23 are fastened to the tube 28 which is located across the truck body. Its ends extend beyond the side panels 7. The hexagonal plates 30 with reinforcing ribs 31 bordering the upper five sides thereof are rigidly fastened to the ends of the tube 28 outside of the truck body. The rig is supported by the four rollers 33, supported on the short axles 34 which are held to the hexagonal plates 30 by the nuts 35. There are two rollers 33 on each side of the truck body, and these are spaced from one another in opposite corners of the hexagonal plate. These rollers are partially enclosed by the channels 37 which keep them in line and protect them from concrete, etc. which may be splashed toward them.

Figure 3:
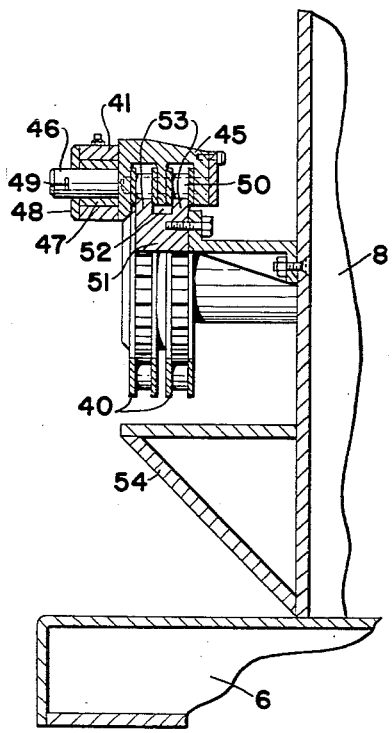
Fig. 3 is a section on the line 3—3 of Fig. 1 and shows on an enlarged scale a detail of the chain drive for the rig.

To keep the mixed concrete in motion and to prevent its setting up while being transported from the site where it is mixed to the site where it is used, the rig is slowly reciprocated from one end of the truck to the other. This movement is imparted to the rig from the double chains 40 located on the two sides of the truck. The chains are similarly connected to the rig on both sides of the truck. The links 41 are bifurcated at their lower ends 42 (Fig. 10) and straddle the plates 43 which are rigidly fastened to the hexagonal plates 30. The parts 42 of the links are pivoted at 44 to these plates 43 (Fig. 10). The chain connectors 45 (Fig. 3) straddle the chains 40. Their outer ends are machined to form the pins 46. The links 41 are fastened around bushings 47 on the pins 46 and are held in place by washers 48 and cotter pins 49. Two chain pins 50 are inserted through chain links and the chain connectors 45, and their outer ends are held in tapped holes in the chain connectors 45 adjacent the pins 46.

The bar 51 suitably supported on the outside of the truck body, is provided with a groove 52 which accommodates the inner sides of the links of the chains 40 on each side of the truck. The outer sides of the links overhang the outer edges of the bars 53. The rollers of the two chains ride on the top portions 53 of these bars. The chain connectors 45 slide on the brackets 54 which are located below the chains 40 when the chain connectors are in the lower reaches of the chains.

The chains 40 extend from the front sprockets 55 supported by the plate 8 to the rear sprockets 56 which are supported from the large sprockets 57 which are fastened to the plates 58 which in turn are fastened to the side panels 7. Other chains 60 extend over these large sprockets and the small driving sprockets 61 which are fastened to the ends of the drive shaft 62. The drive shaft is driven by the chain 65 from the sprocket 66 on a reducing gearbox 67.

As will be explained in what follows, the chain may be driven in either direction. When operated in the direction of the arrows shown in Fig. 1, as the chain connectors 45 are carried from the rear to the front of the truck body by the upper reaches of the chains they pull the rig forward. The forward position of the rig 15 is shown in broken lines, and in this position the links 41 are horizontal, as shown. The rig is moved backward as the links 41 travel with the lower reaches of the chains to the rear of the truck body. The rear position of the rig 15 is similarly shown in dotted lines, and in this position the links 41 are likewise horizontal.

The scraper

In dumping concrete from the truck the front of the truck body may be raised in the conventional manner or, alternatively, the concrete may be pushed to the rear of the truck by the scraper 70. For this purpose the scraper is turned to the lowered position, in contact with the bed. Even though the front of the truck be raised it is desirable to use the scraper 70 to remove the last of the concrete from the bed of the truck.

Figure 2:
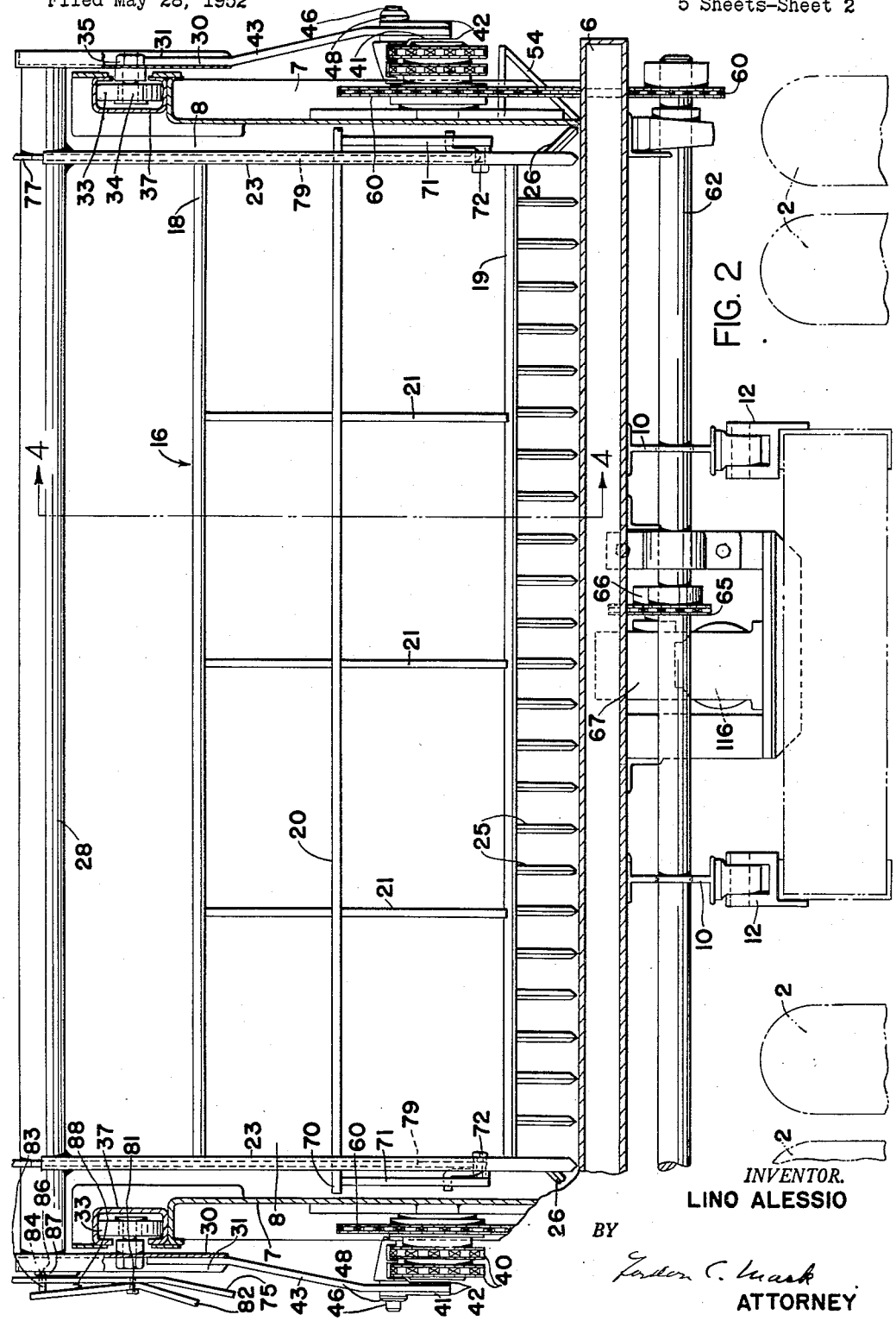
Fig. 2 is a section on the line 2—2 of Fig. 1 on a somewhat enlarged scale.

In Fig. 2 the scraper 70 is shown in the raised position only. In this position its blade is in the same plane as the intermediate bar 20 and serves as a continuation of this bar in agitating the concrete. Being at the front of bar 20, this bar prevents the concrete from forcing the scraper to a lower position as the agitator is moved to the rear of the truck. The front edge of the blade 70 is beveled to help it go through the concrete when the scraper is raised and the agitator is moved forward in the body.

In Fig. 4 the scraper is shown in the raised position in full lines and in the lowered position in dotted lines. The blade 70 is supported at its ends by the arms 71 which are pivoted at 72 to the uprights 23. The position of the scraper is controlled by the handle 75 (Figs. 1 and 2). This handle is rigidly fastened to one end of the bar 76 which is supported by the uprights 77 fastened to the ends of the tube 28. At the ends of the bar 76 are the arms 78. At the outer ends of these arms are the connecting rods 79, the lower ends of which are fastened to the arms 71 (Fig. 4).

Pivoted to the handle 75 at 81 is a second handle 82 (Fig. 2). The pin 83 which extends inwardly from the upper end of this handle 82 passes through an aperture 84 in the handle 75 and thence into the opening 86 in the forward end of the plate 87 fastened to the flange 31 around the plate 30. The spring 88 tends to hold the pin 83 in the hole 86. To lower the scraper one grasps the lower end of the handle 82 together with the handle 75 and this lifts the pin 83 out of the hole 86. The handles are then swung to lower the scraper. The grasp on the handles is then released and the pin 83 presses against the plate 87. The weight of the scraper is sufficient to hold it down. Thus the blade 70 of the scraper is always either in the raised position in which it moves without much hindrance through the body of the mixed concrete, or it is in the lowered position in which it scrapes the bed of the body and removes whatever concrete may cling to the bed as the load is discharged.

The hydraulic system

It is conventional to operate a dump truck by hydraulic pressure derived from a pump operated by the power take-off of the truck. The dumping mechanism of the truck of this invention is operated in this manner, and the mechanism for reciprocating the rig is operated by a motor driven from the same pump. The operation of the hydraulic system will be discussed with particular reference to Fig. 9. The parts shown more or less diagrammatically in Fig. 9 are not drawn to scale. The numbers used to identify the parts in Fig. 9 are the same numbers used to identify the same parts in the other views.

The truck is provided with a conventional separate shift (not shown) to operate the shaft 90 which drives the pump 91 which operates the hydraulic system. The cylinder 92 is used for hoisting the truck body. The piston 93 is connected to the shaft 94 pivoted in the triangular plates 95, and Fig. 1 shows that the rear of each of these plates is pivotally connected at 96 to the chassis 1 and the forward end of each of these plates is pivoted at 97 to one of the rails 10. The front end of the cylinder is fastened to the rod 99 which is pivoted in the supports 100 which are fastened to the top of the chassis. Thus, as liquid is introduced into the cylinder and the piston is expanded the body of the truck is hoisted.

The hoisting of the truck body is controlled by the valve 102 which may be operated from the handle 103 or the handle 104. The hydraulic hose 105 conveys the oil or other liquid from the pump 91 into the valve 102. The valve may be moved to either of two positions by the handle 103 or the handle 104. It may direct the flow of the fluid into the hose 107 and thence into the cylinder or through the hose 108 into a second valve 109. The hose 110 from the cylinder returns the fluid to the pump 91. The position of the handle 112 determines whether fluid entering the second valve 109 through the hose 108 is by-passed to the reservoir 113 through the hose 114, or is sent to the hydraulic motor 116 by the hose 118 or the hose 119. If the fluid enters the hydraulic motor through the hose 118 the motor operates in one direction. If it enters through the hose 119 it operates in the opposite direction. Thus the handle 112 may be set to move the rig in one direction or the other direction, or it may be set to a neutral position which will return the fluid through the hose 114 to the reservoir 113. This reservoir is connected with the pump through the hose 120. If the handle 103 or the handle 104 is moved to direct the fluid through the hose 108 to the second valve, and this second valve is set at neutral so as to return the fluid through the hose 114 through the reservoir 113 to the pump 91, there is no use made of the power derived from the pump 91. However, by proper setting of the handle 103 or 104 the pump may be made to raise the truck body or it may be connected with the hydraulic motor through the valve 109. The truck body is maintained in the raised position and lowered in the conventional manner.

Means for reversing the movement of the rig is shown and this is desirable although not essential. There are many instances in the practical usage of the rig when reversal of its movement greatly facilitates its operation.

The rear of the truck and the tailgate

Figure 5:
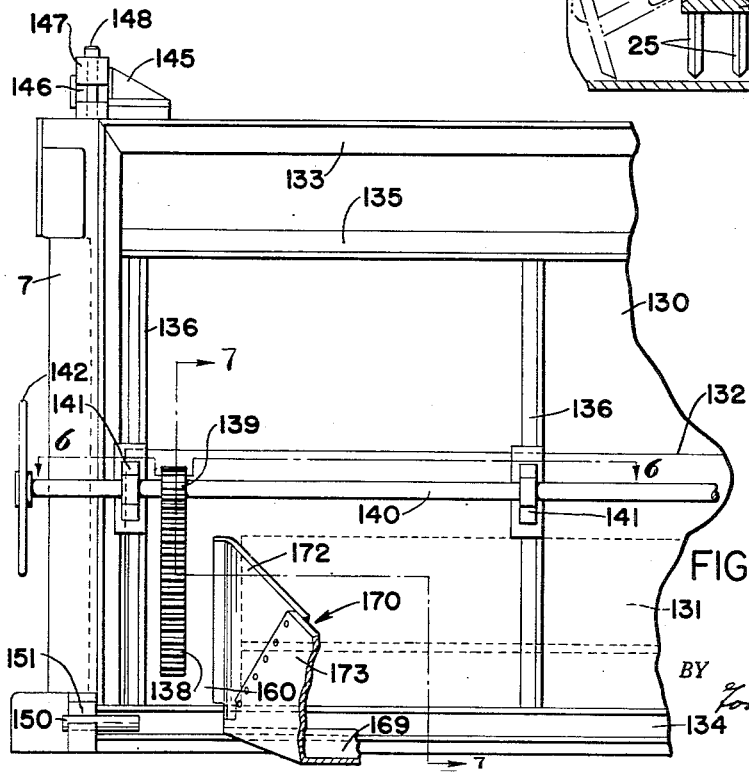
Fig. 5 is a rear view of one side of the truck body with the door in the tailgate closed.

The tailgate 130 covers the rear end of the body. This is a metal plate and there is an opening 131 cut in the lower portion of it. This opening does not extend the entire width of the rear of the tailgate but stops somewhat short of each end, as shown in Fig. 5. The plate 132 is mounted to move vertically and serves as a door for this opening. The tailgate is framed by the angle iron 133 and channel 134. The angle iron 135 extends horizontally across the tailgate a short distance below the angle iron 133. Three angle irons 136 are fastened vertically between the angle iron 135 and the channel 134 and are spaced rearwardly from the tailgate to provide a space 137 in which the door 132 is moved vertically. The racks 138 are fastened near the ends of the door 132 and the pinions 139 on the shaft 140 mesh with these racks. There are bearings 141 on the angle irons 136 which support the shaft 140. At one end of the shaft is the wheel 142 which is used to raise and lower the door. The door is opened any desired width to discharge the concrete at a desired rate.

Fastened to the top edge of the tailgate are the brackets 145. Projecting outwardly from these brackets are studs 146 which are held in slots in the parts 147 fastened to the tops of the channels 37 on the tops of the side panels of the truck body. These studs are held in place by pins 148 (Fig. 1).

The pins 150 are welded to the lower corners of the tailgate and project outwardly therefrom. Brackets which are on the sides of the bed 6 at the rear are notched at 151 as shown in Fig. 1, and the pins 150 are held in these. Spring-loaded latches (not shown) hold these pins in the notches. By releasing these latches the tailgate can be swung upwardly about the pivots 146 and the tailgate thus may be operated in conventional manner. Alternatively, the pins 148 at the top of the tailgate may be raised and the tailgate swung downwardly.

Two rounded plates or blocks or fillets 160 extend forwardly from the bottom of the tailgate. The inner edges of these blocks extend to the edges of the opening 131. Between these plates or blocks 160 is the swivel member 161. This is an angular member welded to the pivot rod 162 which extends across the truck with its ends loosely held in pipes 163 welded to the underside of the blocks 160. When the door 132 is in the lowered position and closes the opening 131, the swivel member 161 may be tilted upwardly and rest against it. The angle of the tilt blends rather smoothly with the curve of the plates or blocks 160. The spikes 25 at the bottom of the rig when the rig is in its rearmost position stop just short of contacting the blocks 160 and the swivel member 161. In the front of the truck body is a plate or block 165 which extends the width of the truck and has a similarly curved surface, and the spikes 25 of the rig stop just short of this when the rig is in its most forward position. The front and rear bottom corners of the body are filled in this manner to prevent concrete from packing in these corners and setting up. This construction helps to keep the concrete in motion by eliminating the sharp corners which cause packing.

When the door 132 is raised as it is when the contents of the body are being dumped, the rear edge of this swivel member falls on the channel 134. The angle irons 136 are cut at the bottom, and the portion 166 of each which is parallel with the rear of the body is bent outwardly to permit the swivel member to fall on the channel 134.

The handle 167 is welded substantially perpendicularly to the long portion of the swivel member and extends below the bed at one side of the truck and is easily reached so that the swivel member can be swung upwardly as the closure member 133 is lowered.

If some material other than concrete is being hauled it generally will be desirable not to raise the swivel member when the door is closed. The swivel member then remains in the horizontal position and the door is lowered vertically onto it.

The bottom 169 of the delivery chute 170 is loosely bolted to the channel 134 at 171. The upper end 172 of each side of the chute is made of rubber or other flexible material to permit adjustment of the chute to any desired angle. The other portion 173 of each side of the chute is made of metal. The chain 174 fastened to the angle iron 133 is looped through an opening in the yoke 175 which straddles the lower end of the chute. There is a hook 176 at the lower end of the chain which may be hooked back into the chain at any location to adjust the angle of the chute. Thus the chute may be raised or lowered as desired. It may be removed when not needed.

When the truck is to be used for materials other than concrete, the chute may be removed. The rig is moved to the front of the truck where the scraper occupies only a little room. The truck then can be used readily for transporting brick, tile, etc., and even sand and the like. Thus although the truck is designed for the transportation of mixed concrete, it can be used for transporting other materials also.

What I claim is:

1. A truck with a body for hauling mixed concrete, a rig supported by the side panels of the body, and means for reciprocating the rig backward and forward of the body, a portion of the rig extending substantially vertically down into the body to serve as an agitator for concrete therein, spikes on the bottom of the rig extending vertically downwardly therefrom with their lower extremities close to the bottom of said body, said portion being open to permit the concrete to pass therethrough as the rig is reciprocated.

2. The truck of claim 1 in which the spikes are arranged in two rows and staggered.

3. The truck of claim 1 in which there is fastened to the front of the rig near the bottom thereof a scraper, and means for lowering the scraper into contact with the bed of the truck body and for raising it out of contact therewith.

4. An open agitator for the body of a truck which is formed with a horizontal reinforcing member intermediate the top and bottom thereof, a horizontally extending scraper blade pivotally fastened to the agitator and substantially horizontal and in line with said reinforcing member when in the raised position, and means for lowering it in contact with the bed of the truck and raising it off the bed and against said horizontal member.

5. An open agitator for the body of a truck which is formed essentially of spaced vertical members and spaced horizontal members and spaced scraper means along its bottom edge, a horizontally extending scraper blade pivotally fastened to the front of the agitator with means for lowering it into contact with the bed of the body and for raising it to a horizontal position against the front of one of said horizontal members.

6. A dump truck with a chassis and body, one end of the body of the truck being pivotally fastened to the chassis, an hydraulic cylinder connected to the chassis and to the body away from said end and adapted to hoist the opposite end of the body from the chassis, an hydraulic pump, drive means connecting the engine with the pump, a liquid reservoir, a first valve, a second valve, an hydraulic motor, an agitator in the body and means operatively connected to the motor for reciprocating the agitator in the body, means for conveying liquid from the reservoir to the pump, thence to the first valve, thence through one outlet to the second valve, and thence through one outlet back to the reservoir, a by-pass from a second outlet in the first valve to the cylinder and thence to the pump and means in the valve for directing liquid to said first and second outlets from the first valve, two liquid connections between two additional outlets in the second valve and the hydraulic motor, and means in the second valve for directing liquid to each of said three outlets therefrom.

7. In the combination of claim 6 in which the means for reciprocating the agitator includes a reducer, a drive shaft across the chassis, means for driving the shaft from the reducer and means for driving the reducer from the hydraulic motor, arms from the agitator extending down the opposite sides of the body on the outside thereof, a continuous chain outside the body on each side thereof and means for driving the same from said shaft across the chassis, and connecting the respective chains and arms a link on each side of the body, the point of connection of each link with its respective arm being intermediate the upper and lower reaches of the respective chains whereby as the chains are driven the links reciprocate the arms whereby the agitator moves back and forth within the truck body.

8. In a dump truck, a tailgate with an opening in the bottom thereof, a vertically slidable door adapted to open and close the opening, and a swivel member pivotally fastened at the level of the bed of the body of the truck in front of the door and close thereto, said swivel member extending horizontally from the pivot to a location to the rear of the opening when the door is raised, and adapted to rest against the door in a backwardly slanting position when the door is down, from which slanting position it will be forced to said horizontally extending position by contents of the truck when the door is raised.

9. In a dump truck, a tailgate with an opening in the center of the lower portion thereof, a vertically slidable door therefor, a rounded fillet extending forward from the bottom of the tailgate on each side of the opening and extending from the opening to the respective edges of the truck body, and a swivel member pivoted with its front edge at the level of the bed of the truck body and adapted to be swung upwardly from a backwardly extending horizontal position to a position slanting upwardly against the door when it is closed, said swivel member being as wide as the opening and fitting between said fillets and into the opening when extending horizontally backwardly.

10. Attached to the rear of the body of a dump truck, a chute with a stiff bottom, the walls of the chute adjacent the lower portion of the bottom being stiff, the walls of the chute adjacent the upper portion of the bottom being flexible and fastened along one edge to the body, the bottom being fastened to the body so that it is movable to different angles, and means of adjustable length connecting the lower portion of the chute to the body.

11. In a dump truck, a tailgate with an opening in the center of its lower portion, a door for closing the opening slidably vertically adjacent the tailgate, a swivel member pivotally attached to the body of the truck with its front at the level of the bed of the body and its rear tiltable against the door when the door is closed and projecting through the opening when the door is open, said swivel member being just narrower than the opening, and a chute fastened to the tailgate by means which permits slanting the chute at different angles to the horizontal and means for supporting the chute at said different angles, the upper edges of the sides of the chute being attached to the tailgate and being composed of flexible material to permit movement of the chute to said different angles.

12. A truck with a body for hauling mixed concrete, a rig supported by the side panels of the body, a tail gate across the rear of the body, an opening in the center of the bottom of the tail gate, a door slidable vertically upward from the bed of the truck and adapted to cover said opening, a swivel member pivotally fastened at the level of the bed of the truck body in front of the door and close thereto, said swivel member extending horizontally from the pivot thereof to a location to the rear of the opening when the door is raised, and adapted to rest against the door in a backwardly slanting position when the door is down, from which slanting position it will be forced to said horizontally extending position by contents of the truck when the door is raised, rounded fillets extending from each edge of the opening in the tail gate to the respective sides of the truck body between which the swivel member slants upwardly when the door is closed, and means for reciprocating the rig back and forth within the truck body and reversing the backward movement of the rig before its bottom touches said fillets and the swivel member.

13. In a dump truck, a tailgate with an opening in only the center of the lower portion thereof, vertical guides spaced backwardly from the tailgate, a vertically slidable door between the tailgate and said guides, racks arranged vertically on the back of the door meshed with pinions supported on said guides, and means for turning the pinions to raise and lower the door, the tailgate being releasably swivelly attached to the body of the truck at both the top and the bottom thereof.

References Cited in the file of this patent

UNITED STATES PATENTS

| | | |
|---|---|---|
| 769,957 | Pharis | Sept. 13, 1904 |
| 874,334 | Harbolsheimer | Dec. 17, 1907 |
| 1,015,390 | Mighill | Jan. 23, 1912 |
| 1,468,551 | Albert | Sept. 18, 1923 |
| 1,468,951 | Anthony | Sept. 25, 1923 |
| 1,484,764 | Dodd | Feb. 26, 1924 |
| 1,622,280 | Fasting | Mar. 29, 1927 |
| 1,684,095 | Heaton | Sept. 11, 1928 |
| 1,714,588 | Bushnell | May 28, 1929 |
| 1,883,473 | Barrett | Oct. 18, 1932 |
| 1,927,653 | Wehr | Sept. 19, 1933 |
| 2,146,676 | Lawson | Feb. 7, 1939 |
| 2,179,726 | Lewis et al. | Nov. 14, 1939 |
| 2,454,481 | Rumsby | Nov. 23, 1948 |
| 2,568,678 | Alessio | Sept. 18, 1951 |